Feb. 23, 1937.  A. Z. MAMPLE  2,071,698
LOCATING DEFECTS IN CABLE SHEATHS
Filed Feb. 1, 1936  3 Sheets-Sheet 1
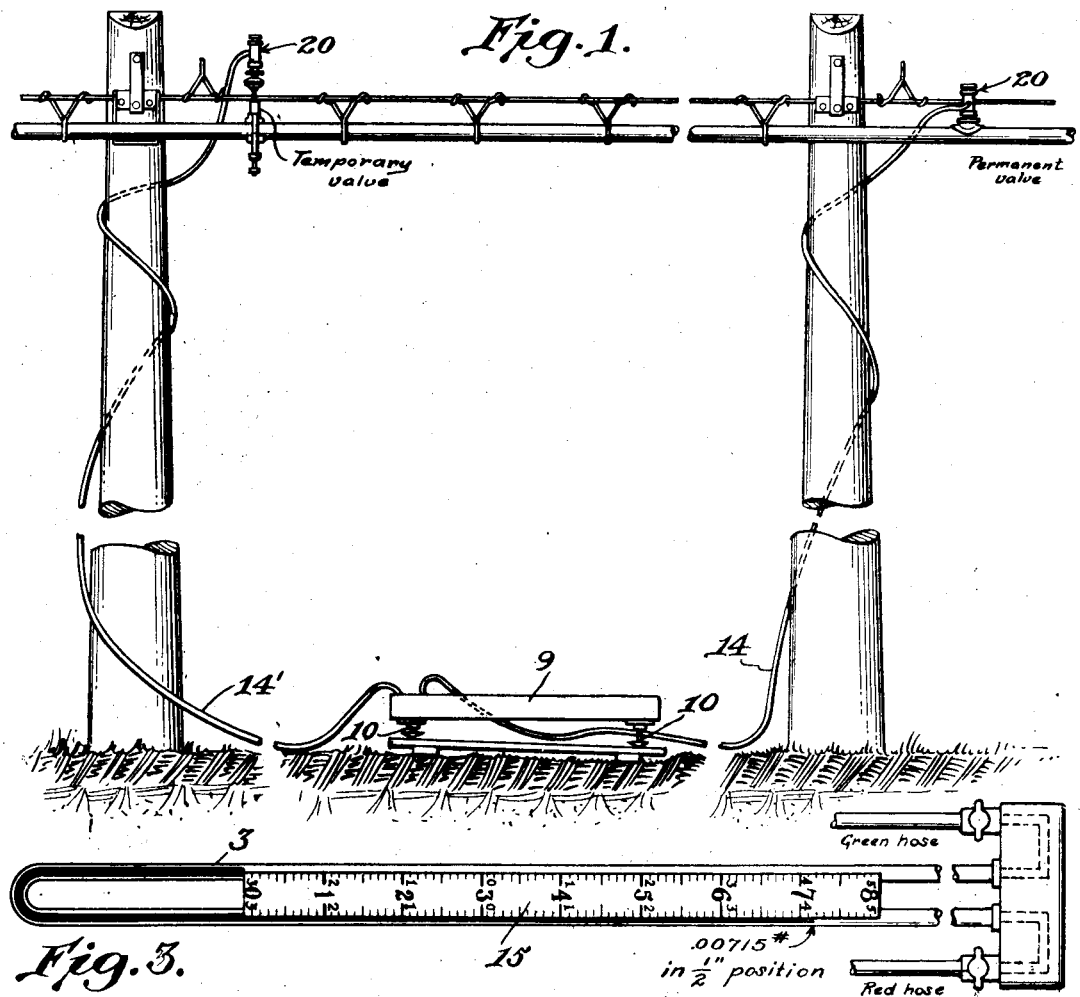
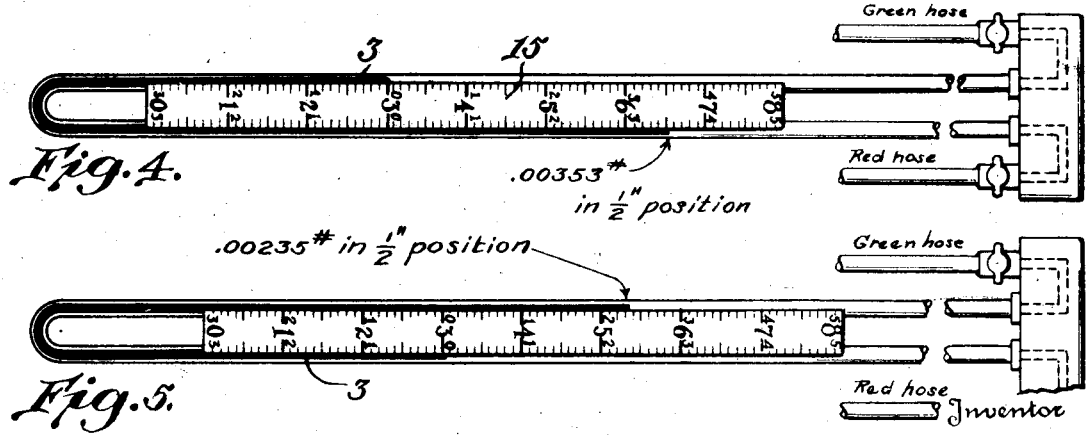
A. Z. Mample

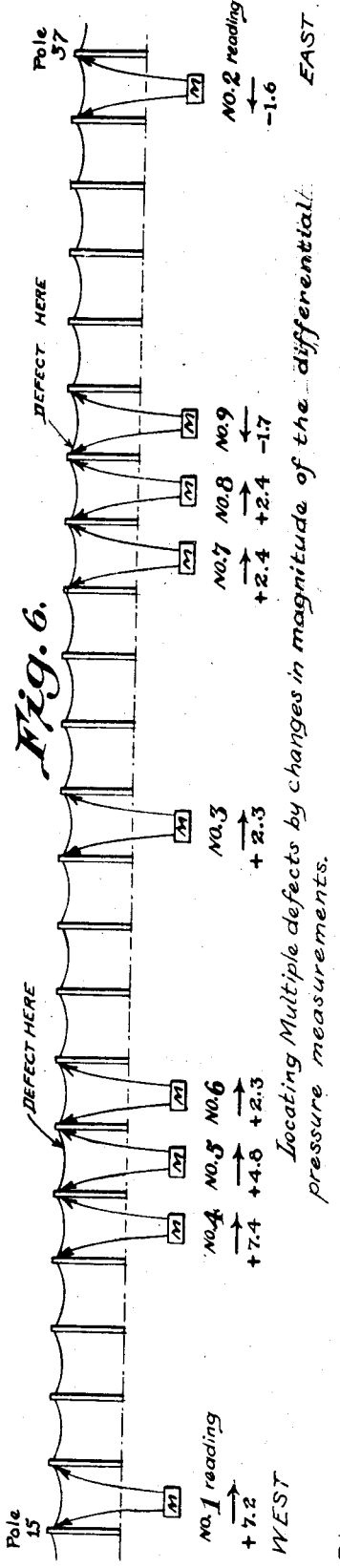
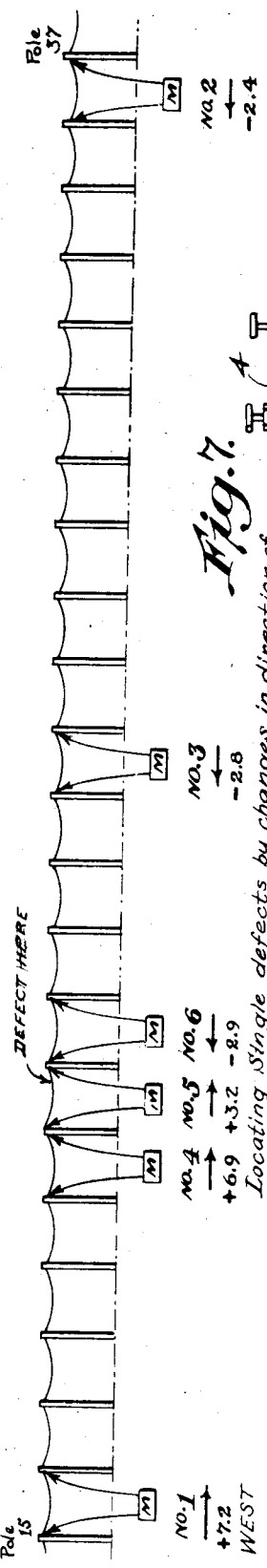
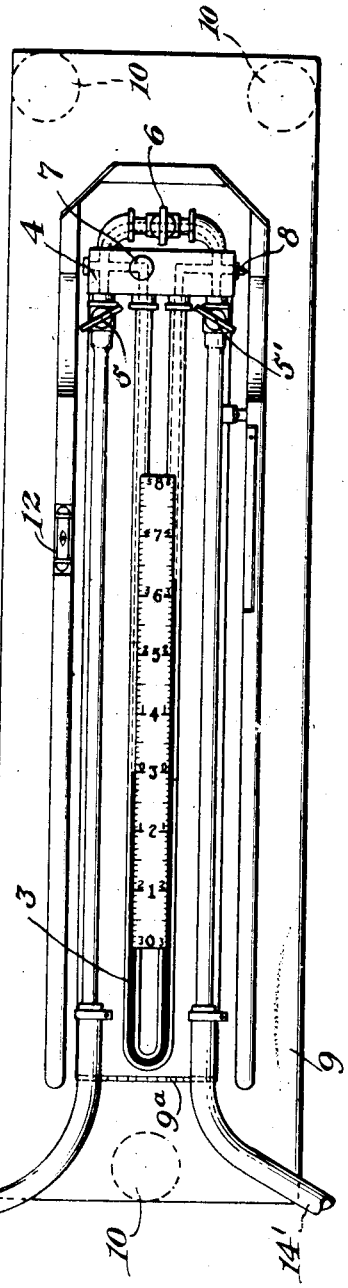

Inventor
A. Z. Mample

Patented Feb. 23, 1937

2,071,698

UNITED STATES PATENT OFFICE 2,071,698

LOCATING DEFECTS IN CABLE SHEATHS

Adolph Z. Mample, Glen Rock, N. J., assignor to The Western Union Telegraph Company, New York, N. Y., a corporation of New York Application February 1, 1936, Serial No. 61,855

6 Claims. (Cl. 137—77)

This invention relates to the location of defects in the lead sheaths of aerial and underground cables and more particularly to the detection and location of leaks by means of differential pressure meters.

Communication cable employed in outside telephone and telegraph plant is predominantly of the paper-insulated, lead-sheathed variety. Since the paper used in such cables is not impregnated in any way, its effectiveness as insulation is entirely dependent on the exclusion of moisture from the core, and hence on the maintaining of the sheath airtight.

In recent years it has been the practice to test the integrity of the lead sheaths by placing a section of the cable under gas pressure and determining the presence of defects by measuring the pressures at points along the cable and plotting graphically the pressure gradient with respect to the length of the cable. Low points in the curve so obtained theoretically indicate the location of the leaks.

The cable is first divided into gas-tight sections by forming wax dams, preferably of the type shown in my Patent No. 1,769,524; at the ends of the cable and at intermediate points, usually about 2½ miles apart. In order that pressure readings may be taken, valves or valved nipples are secured to the sheath at certain points in the manner indicated in my Patent No. 1,998,766 and at intermediate points temporary valves are secured to the sheath without the loss of gas, in the manner disclosed in my Patent No. 1,999,771.

When the valves have been installed the cable is ready for test. Nitrogen gas is admitted through one of the valves, preferably one near the center of the section. After the pressure within the cable has had sufficient opportunity to become equalized, initial pressure readings to determine the preliminary pressure curve are taken at all valves. These readings are taken with mercury manometers. A typical preliminary pressure curve is shown in Fig. 8. The point at which the two extended pressure gradients meet indicates the approximate location of the leak.

As a general rule the preliminary pressure curve is inadequate to indicate the exact location of any but the largest type of leaks. To locate leaks not definitely revealed by this curve, it is necessary to obtain pressure readings at more closely adjacent points within the section under observation.

In taking pressure readings at permanent and temporary valve locations every effort is made to avoid factors which might adversely affect the dependability of the pressure curves. As the pressure within the cable under test is constantly varying because of atmospheric temperature changes and because of a certain amount of gas escaping through the fault or faults which are being sought, the readings are taken simultaneously where practicable. Where this procedure is not practicable, readings at several adjacent locations are taken simultaneously and the readings obtained are correlated in plotting with those obtained at the next group of locations.

Even where the above precautions are taken, it may not be possible to obtain an accurate location of a fault from the pressure curves. Such a condition is usually encountered where the leak in the section of cable is small or where multiple faults exist in the section under test.

The purpose of my invention is to provide a method of detecting small leaks or defects in cable sheaths which could not be detected or located by prior methods, such as those above described, although the method herein described can also be used in the location of large sheath defects.

My invention involves the measurement and comparison of differential pressures along a cable, employing for this purpose an instrument capable of measuring differential pressures in fractions of a thousandth of a pound. In some cases the defects may be located at points where the differential pressures change sign or direction. In other cases the defects are located at points with marked changes in the magnitude of the differential pressure readings of the same sign or direction occur.

My invention will be more clearly understood from the following description in connection with the accompanying drawings, in which—

Figure 1 illustrates the manner of connecting an instrument to valves attached to the sheath of an aerial cable for the purpose of taking a reading of differential pressures.

Figure 2 is a plan view of a differential pressure meter suitable for use in taking readings.

Figure 2a is a fragmentary detail side elevation of the free end of the meter.

Figures 3, 4 and 5 are fragmentary views of a meter showing the manner of taking readings.

Figures 6 and 7 are schematic diagrams illustrating the manner of locating defects in cable sheaths of aerial cables.

Differential pressure meter

Figure 8:
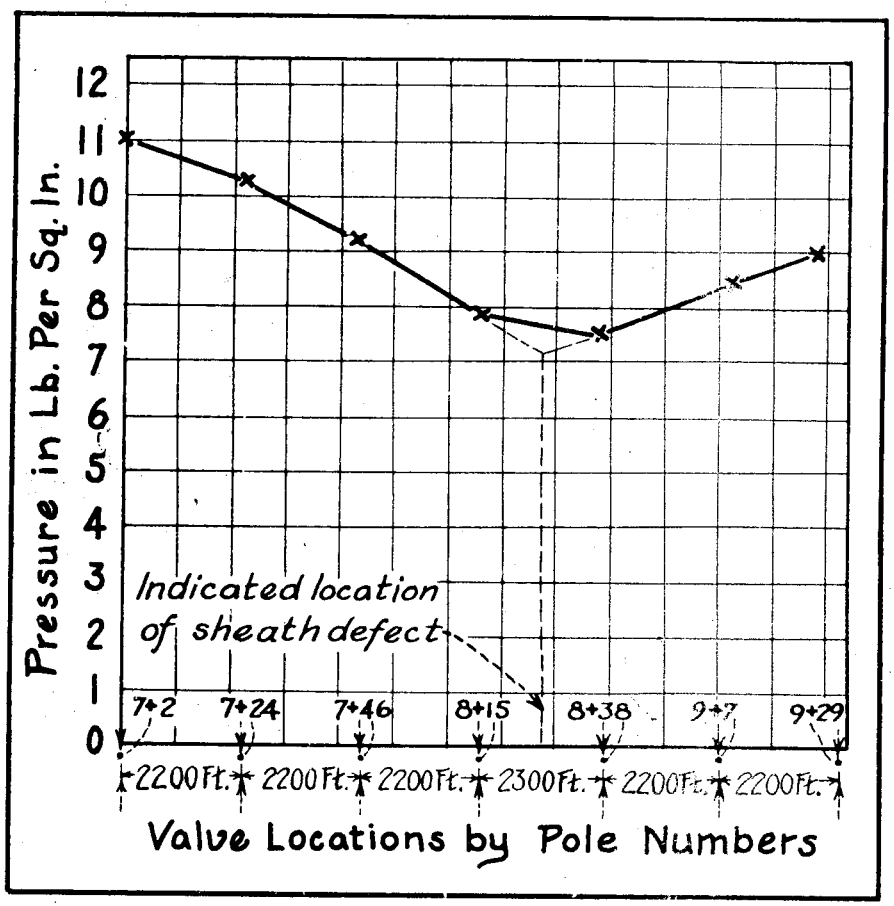
Figure 8 illustrates a typical pressure curve obtained by taking pressure readings at different locations along a section of cable to show the approximate location of a fault in the cable sheath within a gas test section.

The differential pressure meter consists of a U-tube 3 connected to a valve block 4, having two line valves 5, 5' and a by-pass valve 6. The valve block is also provided with a filling plug 7 and a test valve 8. The entire unit is mounted on a mounting plate hinged at one end at 9ª to the housing 9 and adjustable to two or more positions at the other end by means of a suitable scale block.

The instrument may be levelled by means of adjustable legs 10 secured to the bottom of the housing. The same instrument is levelled longitudinally by observing the level 12. To level horizontally the valves 5, 5' are closed and the valve 6 is opened so that the gasolene or other liquids in the U-tube may flow freely. The two legs 10 at one end are then adjusted until the liquid in both sides of the U-tube show the same reading on the scale. The ends of the two rubber hose 14, 14' are connected to the outlet tubes leading from the line valves 5 and 5'.

As shown in my prior patents, Nos. 1,998,766 and 1,999,771, both the permanent and temporary testing valves attached to the cable sheath are provided with inner spring-pressed pins, of the usual bicycle or automobile wheel type, which are depressed to open the valve after the hose coupler is attached.

Figures 9, 10:
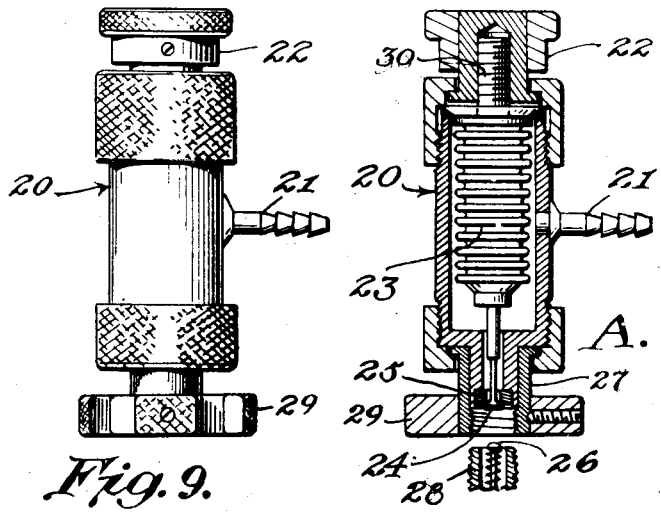
Figure 9 is a side elevation of a hose coupler.
Figure 10 is a vertical sectional view of the hose coupler shown in Fig. 9.

A preferred type of hose coupler is shown in Figs. 9 and 10. The outer end of the hose is secured to the hollow outlet stem 21 which projects laterally from the hose coupler 20. The swivelled nut 27 at the lower end of the coupler is threaded onto the threaded end 28 of a testing valve by rotating the thumb piece 29 until the fibre seat 25 is firmly seated against the valve. The valve control member 22 is rotated to cause the adjusting screw 30 to move downwardly against the top plate of the sylphon bellows 23, thereby depressing the control pin 31 into engagement with the valve pin 26 of the test valve. This opens communication between the gas in the cable and the U-tube in the differential pressure meter.

Differential pressure meter readings

When the instrument has been set up and levelled at the desired location the couplings on the outer ends of the two hose are connected to the valves on the cable in the manner indicated in Fig. 1 and the pins 26 in the test valves are depressed to open the valves by means of the valve controls 22 at the top of the couplers. The line valves 5, 5' on the instrument are then opened, the intermediate valve 6 is closed and the reading of the differential pressure between the two points is observed.

The meter is provided with a slidable scale 15, which as illustrated, is divided into eight major divisions, each major division being sub-divided into ten sub-divisions. The center scale is marked at the bottom with the zero line (0), the graduations ending at the top of the scale with number eight. This scale is normally used for large readings when the zero at the bottom of the scale can be set at the lowest liquid level indicated in either tube.

When the difference in the liquid level in the U-tube is small, the zero at the bottom could not be used so a scale has been provided on both sides of the center scale but with the zero (0) mark of the center scale at the number three (3) of the center scale. When the reading of the meter is small or when the liquid in the U-tube was not adjusted to the approximate mid-point of the U-tube at the beginning of the test, the side scale should be used. The side scale is designed to read five major divisions upwards and three major divisions downward from the zero point.

The value of the major divisions and sub-divisions depends on the setting of the instrument. The instrument mounting is designed to be set at ½ inch, 1 inch or 6 inches from the horizontal and also in the vertical position. The scale block has two settings of ½ inch and 1 inch. The ½ inch setting is considered the normal reading position of the meter. One major division and one sub-division with the instrument in the ½ inch position is equal to one thousandth of a pound (.001 lb.) and one ten thousandth of a pound (.0001 lb.), respectively. For ease in reading, however, each major division should be read in thousandths of a pound as a unit thus two and one tenth major divisions should be read as 2.1. As each sub-division is approximately $\frac{1}{10}$ inch, fractions of a sub-division may be easily read.

The value of a major division with the instrument set in the 1 inch position is twice that of a reading made in the ½ inch position. The value of a reading in the 6 inch or in the vertical position is 12 and 48 times, respectively, the value of the reading in the ½ inch position.

The reading of the scale with the instrument set in the ½ inch position is illustrated in Figures 3, 4 and 5. The value of the reading in Fig. 3 is 7.15 thousandths of a pound (.00715 lb.) while the value of the reading in Fig. 4 is 3.53 thousandths of a pound (.00353 lb.). Both of the readings in Fig. 3 and Fig. 4, indicate the differential pressure of a gas flowing in the cable from the green hose cable connection to the red hose cable connection. The value of the reading in Fig. 5 is 2.35 thousandths of a pound (.00235 lb.) and indicates the differential pressure of a gas flowing in the cable from the red hose connection to the green hose connection.

Relation of rate of gas flow to defect in test section

Where a differential pressure meter reading is to be made in proximity to a defect and a single defect exists in a test section, the rate of flow of gas through the cable between the defect and one end of the test section is, in general, in direct proportion to the rate of flow of gas in the cable between the defect and the opposite end of the test section. This relation of rates of flow is generally in direct proportion to the distance of the defect from one end of the test section and the distance of the defect from the other end of the test section.

Thus in a 12,000 ft. test section where a defect is indicated 8,000 ft. from one end by a set of pressure meter readings, the rate of flow of gas in the 8,000 ft. section would be approximately twice the rate of flow of gas in the 4,000 ft. section included between the defect and the opposite end of the test section. Since the rate of flow is directly represented by the differential pressure meter reading, the above may be interpreted in terms of differential pressure meter readings assuming the distance between valves to which the meter is connected is the same for reading and the readings are made in close proximity to the defect.

Where more than one defect exists in a test section, the above rule will apply in a general way only insofar as the curve of two or more defects produces a resultant curve similar to a curve of one defect. Such a curve will be similar in cases where one defect is obviously so large that the other defects are merely indicated by slight changes in the curve gradient.

In a series of differential pressure meter readings approaching the location of a defect from one side, the rate of flow or value of the readings will increase slightly as the defect is approached. This is more pronounced on the side of the defect having the higher pressure gradient.

*Locating defects in aerial cables*

Where a defect is to be located in aerial cable situations with the differential pressure meter, the location of the first reading of differential cable pressures should, in general, be at the permanent valve nearest the fault indicated on the curve of pressure meter readings such as illustrated in Fig. 8. Where such indicated location would place the first reading at a permanent valve adjacent to a dam at the end of a test section, the first reading should be taken at the second permanent valve from the end of the test section indicated.

A second reading should then be made at the permanent valve adjacent to the first valve in the direction indicated by the first differential pressure meter reading.

A fault may be indicated between the points at which the first and second readings were made by studying the differential pressure readings. If the direction or sign of the readings reverse so as to point between the two reading points, a fault is indicated in the section of cable included. If the direction or sign of the readings does not reverse, but there is a marked decrease in the value of the second reading, a defect is indicated in the section of cable included and a second defect is indicated in the adjacent section of cable beyond the second reading.

This method will be more readily understood from the following examples. In Fig. 6, I have illustrated the manner of locating defects by noting a change in the values of the differential pressures and in Fig. 7 I have shown how a defect may be located by noting a change in the direction of the differential pressures.

The test zone shown in Fig. 6 extends from pole No. 15 to pole No. 37. A reading is first taken on the differential pressure meter at pole 15 which gives a reading of +7.2 east. A second reading is then made at the pole No. 37, the other limit of the section under test, which gives a reading of −1.6 west. These two readings show that a defect or defects in the cable sheath are within the test limits. Reading No. 3 is next taken about midway of the section and shows +2.3 east. This reading shows two things with relation to the 1st and 2nd readings:

(a) That there is a fault west of the +2.3 east reading because the value of the reading has been reduced from +7.2 east to +2.3 east, although the direction sign of the readings is the same; and (b) That there is also a fault east of the +2.3 east reading because the sign or direction of flow is opposite to the No. 2 reading of −1.6 west.

Now continuing to take readings with the differential pressure meter west of No. 3 readings, we find that No. 4 reading is +7.4 east, showing that the fault is east of No. 4 reading because No. 1 and No. 4 when corrected for spacing between meter connections are the same. Another reading No. 5, shows +4.8 east, which is a drop from the No. 1 reading while No. 6 reading shows +2.3 east, showing a large drop in pressure from No. 1 reading but substantially the same as No. 3 reading. A fault is therefore indicated by the No. 5 reading of +4.8 east which is shown by the change in magnitude of the differential pressures but without a change in the sign or direction of gas flow.

Now it was evident that there was also a defect or fault between the No. 2 and No. 3 readings. Reading No. 7 taken about midway between these readings gives +2.4 east so also does reading No. 8, indicating that the fault is between No. 2 and No. 8. A further reading No. 9, shows −1.7 west, thereby locating the fault between No. 8 and No. 9 readings due to a change in sign or direction of gas flow.

Thus two or more defects in a cable can readily be located by a change in the value of differential pressures even though there is no change in the direction. One of the defects only will be finally located by a change in direction but all except one, where more than one defect exists, will be located by changes in values only, except where the distances between defects are great.

I have indicated in Fig. 7 the manner of locating a fault by noting changes in the signs or direction of gas flow in the differential pressure readings. A reading No. 1 taken at the west end of the section under test indicates +7.2 east while reading No. 2 at the opposite end of the section shows −2.4 west, thus indicating a fault intermediate of the ends. Reading No. 3 about midway is −2.8 west, thus indicating a fault between No. 1 and No. 3 readings. Reading No. 4 shows +6.9 east thereby definitely indicating the fault to be between No. 4 and No. 3 reading points. A No. 5 reading of +3.2 east would indicate a fault at this point. As a further check a reading at No. 6 of −2.9 west definitely locates that the fault is at reading point No. 5. It is to be noted that the fault is located by a change in value and checked by a change in sign or direction of the differential cable pressures.

I claim:

1. The method of detecting and locating defects in the sheaths of lead sheathed cables, which consists in placing a section to be tested under gas pressure, recording the difference in gas pressure between adjacent pairs of points in the sheath, at a series of locations along said section, and determining from the differential pressure thus obtained where the greatest drop in pressure occurs, in the readings of adjacent pairs of points thereby locating the position of the defect.

2. The method of detecting and locating defects in the sheaths of lead sheathed cables, which consists in isolating a section to be tested and placing it under a certain gas pressure, recording the difference in gas pressure and the direction of gas flow between adjacent pairs of points in the sheath at a plurality of locations along said section, and determining the location of defects by the change in direction of gas flow on either side of a given point.

3. The method of detecting and locating defects in the sheaths of lead sheathed cables, which consists in isolating a section to be tested and placing it under gas pressure, measuring the difference in gas pressure and the direction of gas flow between adjacent pairs of points in the sheath at a plurality of locations along said section and determining the location of defects from the differential pressure readings thus obtained by changes in the direction of flow, and by changes in the rate of flow of the gas.

4. The method of detecting and locating defects in the lead sheaths of communication cables, which consists in damming the ends of a section to be tested, placing the section under a certain gas pressure, plotting the gas pressures taken at a series of locations along the cable to indicate the point or points of lowest pressure, and measuring the difference in gas pressure and the direction of gas flow between pairs of points in the sheath at a plurality of locations upon either side of said low point or points and determining the exact location of the defect or defects by a difference in differential pressures or a change in the sign or direction of gas flow.

5. The method of detecting and locating defects in the sheaths of lead sheathed cables, which consists in placing a section to be tested under gas pressure, measuring the difference in gas pressure between adjacent pairs of points in the sheath at a series of locations along said section, comparing the magnitude of differential pressure readings thus obtained between said pairs of points and noting when the reading taken between any pair of points differs materially in magnitude from the readings taken upon both sides of said pair of points to thereby determine the location of the defect.

6. The method of detecting and locating defects in the sheaths of lead sheathed cables, which consists in isolating a section to be tested and placing it under a certain gas pressure, measuring the difference in gas pressure and the direction of gas flow between adjacent pairs of points in the sheath at a plurality of locations along said section and comparing the magnitude of the differential pressure readings upon both sides of a point of change in direction of gas flow to determine the location of a defect by a material change in the magnitude of said readings.

ADOLPH Z. MAMPLE.